(12) United States Patent
Bernstein et al.

(10) Patent No.: US 11,250,432 B2
(45) Date of Patent: Feb. 15, 2022

(54) SYSTEMS AND METHODS FOR REDUCING FRAUD RISK FOR A PRIMARY TRANSACTION ACCOUNT

(71) Applicant: American Express Travel Related Services Company, Inc., New York, NY (US)

(72) Inventors: Kathi L. Bernstein, Murray, UT (US); Youngjoon Park, New York, NY (US)

(73) Assignee: America Express Travel Related Services Company, Inc., New York, NY (US)

( * ) Notice: Subject to any disclaimer, the term of this patent is extended or adjusted under 35 U.S.C. 154(b) by 525 days.

(21) Appl. No.: 15/097,624

(22) Filed: Apr. 13, 2016

(65) Prior Publication Data

US 2017/0300918 A1 Oct. 19, 2017

(51) Int. Cl.
*G06Q 40/00* (2012.01)
*G06Q 20/40* (2012.01)
*G06Q 20/38* (2012.01)

(52) U.S. Cl.
CPC ....... *G06Q 20/4016* (2013.01); *G06Q 20/385* (2013.01)

(58) Field of Classification Search
CPC ................................................. G06Q 20/4016
See application file for complete search history.

(56) References Cited

U.S. PATENT DOCUMENTS

| 5,991,750 A | 11/1999 | Watson |
| 6,516,056 B1* | 2/2003 | Justice ............... G06Q 20/4016 379/114.01 |
| 6,901,387 B2 | 5/2005 | Wells |
| 7,881,861 B2* | 2/2011 | Kravets ............. G01C 21/3484 340/995.12 |
| 9,031,877 B1 | 5/2015 | Santhana et al. |
| 2004/0003042 A1* | 1/2004 | Horvitz ................ G06Q 10/109 709/204 |

(Continued)

OTHER PUBLICATIONS

International Preliminary Report on Patentability dated Oct. 25, 2017 in Application No. PCT/US2017/019003.

(Continued)

*Primary Examiner* — Mike Anderson
(74) *Attorney, Agent, or Firm* — Thomas | Horstemeyer, LLP (57) ABSTRACT

The system protects an account through the use of tokens, thereby eliminating the need to expose the primary account identifier during a transaction. If a primary account identifier is compromised, any use of the primary account identifier to facilitate a fraudulent purchase or settlement transaction may be blocked by the system. The system is configured to receive a payment authorization request including a payment account first identifier. The payment account first identifier serves as a search condition for a query, which is executed against a database to retrieve payment account information, if the payment account information exists. The system sends a decline response in response to the payment account first identifier and a primary account identifier from the payment account information being the same, indicating that a primary account is being used.

20 Claims, 3 Drawing Sheets

(56) References Cited

U.S. PATENT DOCUMENTS

| | | | | |
|---|---|---|---|---|
| 2004/0133507 | A1* | 7/2004 | Barbour | G06Q 20/04 705/38 |
| 2005/0038718 | A1* | 2/2005 | Barnes | G06Q 10/087 705/28 |
| 2007/0071209 | A1* | 3/2007 | Horvitz | G06Q 10/109 379/201.06 |
| 2008/0154696 | A1* | 6/2008 | Spiegelman | G06Q 30/02 705/7.32 |
| 2008/0214157 | A1* | 9/2008 | Ramer | G06Q 10/00 455/414.1 |
| 2009/0265211 | A1* | 10/2009 | May | G06Q 20/403 705/18 |
| 2010/0250410 | A1* | 9/2010 | Song | G06Q 30/0248 705/30 |
| 2013/0018793 | A1 | 1/2013 | Wong et al. | |
| 2013/0030994 | A1* | 1/2013 | Calman | G06Q 30/02 705/40 |
| 2013/0103482 | A1* | 4/2013 | Song | G06Q 30/02 705/14.26 |
| 2014/0058949 | A1* | 2/2014 | Ciurea | G06Q 40/00 705/44 |
| 2014/0250011 | A1* | 9/2014 | Weber | G06Q 20/4016 705/44 |
| 2015/0032627 | A1* | 1/2015 | Dill | G06Q 20/40 705/44 |
| 2015/0134540 | A1* | 5/2015 | Law | G06Q 20/02 705/72 |
| 2015/0178724 | A1* | 6/2015 | Ngo | G06Q 20/327 705/71 |
| 2015/0227913 | A1 | 8/2015 | Ballout | |
| 2015/0254641 | A1 | 9/2015 | Bondesen et al. | |
| 2015/0278817 | A1 | 10/2015 | Abifaker et al. | |
| 2015/0278819 | A1* | 10/2015 | Song | G06Q 20/042 705/45 |
| 2015/0339667 | A1* | 11/2015 | Dua | G06Q 20/3674 705/16 |
| 2015/0348146 | A1* | 12/2015 | Shanmugam | G06Q 30/0603 705/71 |
| 2016/0086169 | A1* | 3/2016 | Jodoin | G06Q 20/385 705/66 |

OTHER PUBLICATIONS

International Search Report and Written Opinion dated May 5, 2017 in Application No. PCT/US2017/019003.
Office Action dated Aug. 14, 2019 in CA Application No. 3,020,687.
Examination Report No. 1 dated Aug. 6, 2019 in AU Application No. 2017248999.
European Search Report dated Aug. 14, 2019 in EP Application No. 17782780.5.
Supplemental European Search Report dated Aug. 30, 2019 in EP Application 17782780.5.

* cited by examiner

SYSTEMS AND METHODS FOR REDUCING FRAUD RISK FOR A PRIMARY TRANSACTION ACCOUNT

FIELD

This disclosure relates to managing risk for a primary transaction account having associated transaction accounts.

BACKGROUND

Digital transactions may include a consumer providing transaction account information to complete a transaction. The account information may take the form of an account token that is associated with a primary (or master) transaction account, but the account token does not reveal the account identifier of the primary transaction account. Tokenized account information may be stored on a digital wallet running on a user device, stored in a file at a merchant (or service provider), stored at an application content provider, and/or stored on a user device in an application. Storing transaction account information at additional locations increases the risk of an information breach. Similarly, the risk of an information breach is increased in response to transmitting transaction account information between parties in a transaction. Although tokenized transaction accounts can provide a degree of protection to the primary account, the fraud risk from a compromised primary account identifier may be reduced, but the fraud risk is not entirely eliminated. Also, because a primary account most often does not carry the use restrictions that are placed on associated token accounts, the potential loss can be significantly high from a compromised primary transaction account identifier.

SUMMARY

In various embodiments, an authorization system may receive an authorization request including a payment account first identifier. In response, the authorization system may construct a query having a search condition, wherein the search condition may be the payment account first identifier. The query is run against a database by the authorization system. In response to the payment account information including the search condition, the authorization system may retrieve payment account information from the database. In response to the payment account first identifier and a primary account identifier from the payment account information being the same, the authorization system may send a decline response.

In various embodiments, the request may be a payment authorization request or a settlement request. Also, the payment account first identifier and/or the payment account second identifier may be an account token. The authorization system may parse the authorization request to identify the payment account first identifier. The database may comprise a relational database management system and/or a data file. In various embodiments, the decline response may be sent to a source of the authorization request.

The authorization system may send an authorization response in response to the payment account first identifier and a primary account identifier from the payment account information not being the same. The response may not be sent in response to the payment account information not including a transaction block indicator.

In various embodiments, a merchant system may transmit an authorization request including a payment account first identifier to an authorization system, wherein the authorization system may construct and run a query having a search condition comprising the payment account first identifier. The authorization system may retrieve payment account information from a database in response to the payment account information including the search condition. The merchant system may receive a decline response in response to the payment account first identifier and a primary account identifier from the payment account information being the same. In various embodiments, the merchant system may receive an authorization response in response to the payment account first identifier and a primary account identifier from the payment account information not being the same.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The present disclosure provides a system, method, and computer program product for partially or fully protecting a primary transaction account having one or more associated account identifiers. In general, the system reduces fraud risk for a primary transaction account. The system includes a computer processor and a memory that stores instructions for receiving an authorization request including a payment account first identifier. The system constructs a query having a search condition, where the search condition is the payment account first identifier. The query is executed against a database to retrieve payment account information from a database in response to the payment account information including the search condition. A decline response is sent by the system in response to the payment account first identifier and a primary account identifier from the payment account information being the same or satisfying certain conditions.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Figure 1:
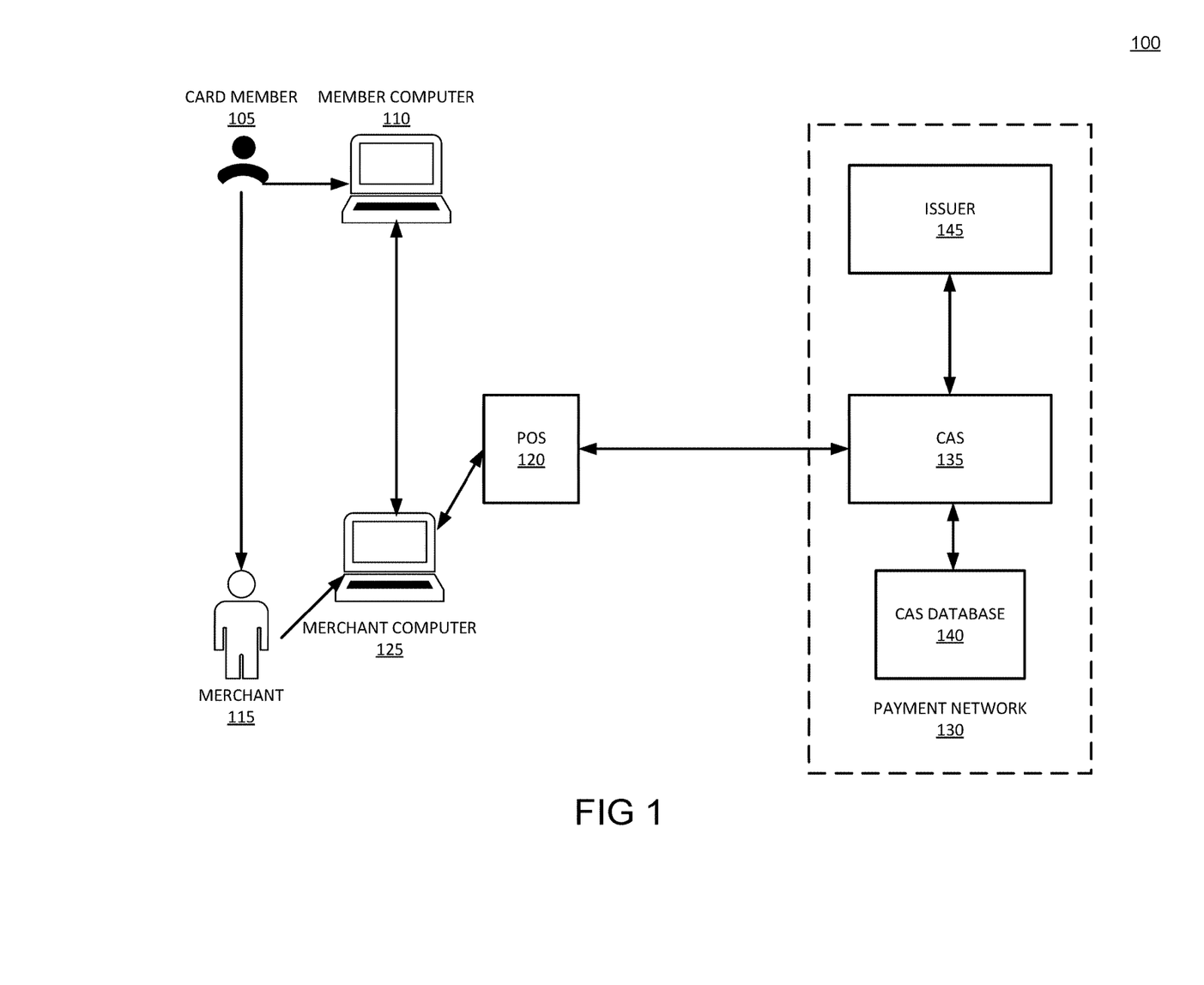
FIG. 1 is a diagram illustrating components for a token-based system for completing purchase transactions, in accordance with various embodiments.

With reference to FIG. 1, system 100 includes a user computer 110 that provides an interface for an account holder 105 to access account properties for an account. In various embodiments, a web page provides a client-side interface for presenting account related information according to a user's preferences/needs.

In various embodiments, a user may serve the roles of both primary account holder and associate account holder. For example, a primary account holder may interact with the systems to request and then receive an account token in order to have use of the primary account, without exposing the primary account identifier. In general, a user may be any entity that uses any of the systems or engages in the processes disclosed herein. More specifically, the user may be defined by the function they perform at any given time while carrying out the processes disclosed herein.

A merchant computer 125 is operated by a merchant 115. Merchant computer 125 interacts with authorization system 135 (which may be a central authorization system (CAS)). CAS 135 authorizes both payment and settlement transactions with an issuer or bank. In various embodiments, merchant computer 125 communicates via a network with user computer 110 for facilitating transactions over the Internet, for example. In accordance with various embodiments, account holder 105 provides payment account information to merchant computer 125 through an interface at user computer 110.

As used herein an "identifier" may be any suitable identifier that uniquely identifies an account token and/or a primary transaction account. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

In various embodiments, the account holder 105 and merchant 115 may interact with the system 100 by way of a computing unit in the form of a personal computer, although other types of computing units may be used including laptops, notebooks, hand held computers, set-top boxes, cellular telephones, touch-tone telephones and the like. The merchant has a merchant computer 125 implemented in the form of a computer-server, although other implementations are contemplated by the system. The issuer 145 has a CAS 135 shown as a main frame computer. However, the CAS 135 may be implemented in other forms, such as a minicomputer, a PC server, a network of computers located in the same of different geographic locations, or the like. Moreover, the system contemplates the use, sale or distribution of any goods, services or information over any network having similar functionality described herein.

The merchant computer 125 and the user computer 110 may be interconnected via a second network, referred to as a payment network 130. The payment network 130 which may be part of certain transactions represents existing proprietary networks that presently accommodate transactions for payment accounts, debit accounts, and other types of financial/banking accounts. The payment network 130 is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

In various embodiments, a merchant 115 may include an electronic commerce system implemented as computer software modules loaded onto the user computer 110 and the CAS 135. The merchant computer 125 may not require any additional software to participate in the online commerce transactions supported by the online commerce system.

To format and send transaction data (e.g., encrypted transaction data) to a payment network, merchant computer 125 includes a POS 120 device and/or software. In various embodiments, the POS 120 resides as a standalone device that captures account information from data entry, a magnetic strip, near-field communications (NFC) and/or any other communication technology. In various embodiments, the POS 120 takes the form of software residing at the merchant computer 125. POS 120 may be a third-party software product that allows capture of account information and transaction details through a combination of software and hardware.

Payment network 130 facilitates account authorization and settlement features for one or more participating issuers. The payment network 130 receives account information from a merchant and routes authorization requests and response messages accordingly. The payment network 130 may be an intermediary between POS 120 and CAS 135. CAS 135 comprises any number of computers, software, databases and networks. CAS 135 may be directly associated with an issuer 145. CAS 135 receives a transaction request from the payment network 130 and incorporates data from any number of computing systems and databases to evaluate the transaction request.

An associated account token may represent a transaction account or other payment account identifiers. An account token may comprise any code. In various embodiments, an account token may comprise a unique number that resembles a standard transaction account code in both number of digits and format. As such, the token may be configured to be processed over a participating payment network with minimal or no changes to the hardware and software of the point of sale (POS) systems. Moreover, the token may be configured to be at least primarily processed over a payment network as a standard payment account transaction.

As used herein, phrases similar to "tokenize" or "tokenization" may refer to generation of an alias or alternative identifier for sensitive data. For example, an account token may comprise an alternative account identification code generated to obfuscate an actual transaction account code for inclusion in payment transactions, whether those transactions are facilitated by a POS or online (e.g., a web-based merchant payment form). In that regard, tokenization of sensitive data may tend to create a barrier for third parties trying to capture the underlying sensitive data. Tokenization further restricts or prevents use of a payment transaction account beyond one or more defined parameter(s) such as, for example, an identity of a specific merchant and a transaction amount. Additional parameters may include, for example, a maximum overall spend amount, maximum number of transactions, maximum transaction amount, and expiration date.

In various embodiments, an account token is generated in response to a request from an authorized primary account holder that is able to interact with an interface to the system. System may be owned and managed by an issuer of transaction accounts. In various embodiments, the system 100 may be owned and managed by a third-party that provides the disclosed token management features for one or more contracting issuers.

In various embodiments, the primary account holder is the holder of a payment account having authority over one or more associate account holders. An interface may be integrated with an existing online account management interface or provided in a unique interface as an add-on service to subscribing primary account holders.

In various embodiments, primary account holders may access the online interface to view account details including statements, modify account preferences, manage points/rewards, and request a merchant specific token. In various embodiments, the primary account holder requests an account token by selecting from a list of known merchant identifiers or entering a specific merchant identifier, if known. With regard to the list of known merchant identifiers, the list may be populated based on prior transaction history or simply list merchants that have been authorized to process financial transactions over the participating payment network.

Phrases and terms similar to "merchant" may be used interchangeably with each other and shall mean any person, entity, distributor system, software and/or hardware that function as a provider, broker and/or any other entity in the distribution chain of goods or services. For example, a merchant may be a grocery store, a retail store, a travel agency, a service provider, an on-line merchant or the like. By way of a POS, for example, a merchant may be the party responsible for collecting token information from the user. A merchant's POS or similar device may transmit this information along with transaction details over a payment network as an authorization request.

In various embodiments, the methods may be implemented in any scenario where there exists a primary account holder having a primary account identifier (e.g., a transaction account). One or more account tokens may be provided to one or more associate account holders to allow transactions for items to be made against the account that corresponds with the primary account identifier.

In various embodiments, use parameters may be applied to account tokens. Account token use parameters, which may be defined by the primary account holder, govern account token use by associate account holders in terms of spend amount, location, date, merchant, and the like. Once defined, the use parameters are stored with the token information that is later retrieved during an authorization request based on that particular token. Similar to the manner whereby an authorization is based at least partly on an available balance of a credit account, the use parameters are retrieved during an authorization in order to determine whether the requested transaction complies with each of the use parameters.

By relying on a token to facilitate account spend, a need does not exist for exposing the primary account identifier during a transaction, where it might be compromised by, for example, a card skimmer device, a dishonest merchant employee, a network hacker, and the like. The token may be used in place of the primary account identifier, effectively shielding the primary account identifier from being fraudulently attained and subsequently used. For example, a primary account holder may pay for merchandise by way of an account token instead of using the primary account identifier. The primary account identifier may be stored in a secure location in hardcopy or digital form. Accordingly, the primary account identifier remains unused and out of view of fraudsters.

In various embodiments, the primary account holder may delegate associate account holders that are authorized to spend against the account. An associate account holder may be identified by a unique payment account identifier that is generally static and unique from the primary account identifier and one or more related account tokens. In various embodiments, the primary account holder is provided access to an interface in order to add and remove account tokens as well as define, modify, add, and remove use parameters that govern use of the account tokens. The interface may include, for example, a client-side and/or a server-side computer program.

In various embodiments, an account token takes the form of a hard and/or soft-token. A hard-token may comprise, for example, a plastic card with an account token printed on one side. A soft-token may be stored digitally in an electronic device having computer memory, such as a personal computer, laptop computer, tablet computer, smartphone, watch, electronic wallet device, smartcard, and etc.

In various embodiments, an account token is generally static and is generated for repeat or single use in accordance with use parameters. Accordingly, the primary account holder may interact with an interface to request generation of an account token in advance of a purchase transaction. In response, the system generates an account token by way of a cryptographic operation and issues an account token that may be provided either directly to an identified associate account holder or to the primary account holder, who then distributes the account token to an associate account holder. Tokens may be distributed by any means known in the art for loading tokens into wallet applications and devices. For example, a token might be sent as an attachment to an email that is addressed to a college-age child of a primary card member. The receiving child may then download the token into a wallet application on her iPhone, where it is available for subsequent use.

In various embodiments, an account token may be limited to a single-use and is requested during a purchase transaction, either by way of a merchant device (e.g., POS), a user's device (e.g., a smartphone), or a combination thereof (e.g., request originating from smartphone results in token being delivered to a POS). In any case, an account token may be generated in response to a request that causes an account token to be generated to facilitate payment in a specific transaction by an authorized user. In accordance with various embodiments, the account token guards an account from fraudulent use by allowing generation of a single-use account token that is issued only in response to a specific transaction. Because a token may be generated based on the properties of a transaction (e.g., $10.99 purchase with merchant 620 at 10:02 PM), the token may be created with very specific use parameters that meet the unique transaction properties (e.g., setting a maximum cumulative spend amount at $10.99). As a result, any attempt to reuse token for a subsequent transaction would be necessarily declined because the subsequent transaction would not be within the use parameters for the token.

The generation and use of account tokens has been generally described to assist the reader in fully understanding the disclosed system for reducing fraud risk to a primary transaction account. Those of ordinary skill in the art will appreciate that the disclosed methods and systems may be applied to virtually any scenario that would benefit from securing a primary account, where that account is useable by any number of defined proxies.

Methods are described for reducing fraud risk for a primary transaction account. In general, the methods include an authorization system that is configured to receive an authorization request, including a payment account first identifier. The payment account first identifier is used as a search condition in a query that is constructed by the system and executed against a database. The query might comprise a SQL "SELECT" statement with the payment account first identifier being used as the "WHERE" clause (e.g., "SELECT * from card_data WHERE payment_card_ID=4168 2138 2256 3391"). If a database record includes the search parameter, the system retrieves payment account information from the database record. The system compares the payment account first identifier to a primary account identifier from the payment account information. If the two identifiers match, then it is determined that the authorization request is based on the primary account identifier and the transaction is blocked. The system sends a decline response to the originator of the authorization request.

Figure 2:
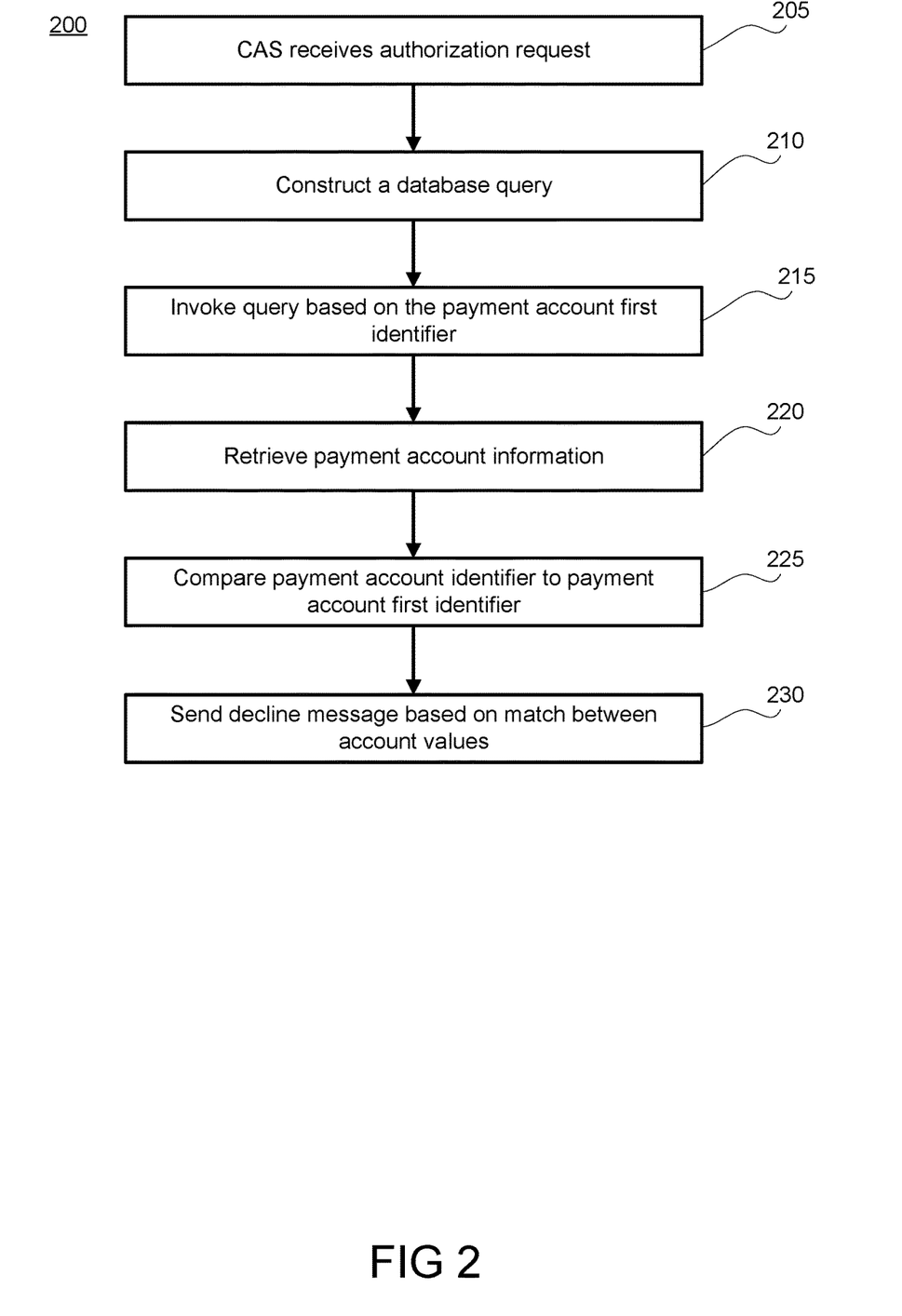
FIG. 2 is flow chart illustrating a process for completing purchase transactions in a token-based system, in accordance with various embodiments.
Figure 3:
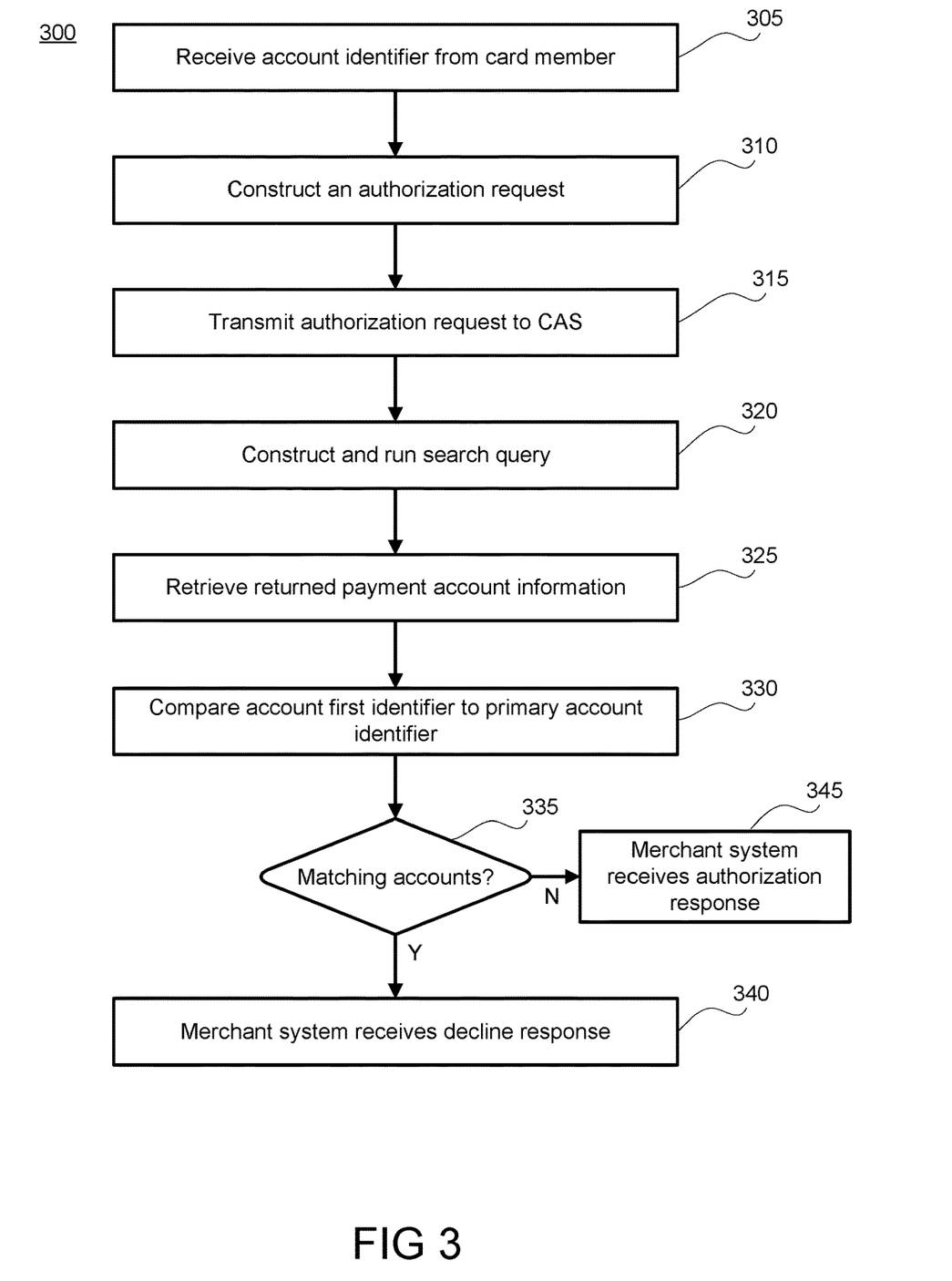
FIG. 3 is flow chart illustrating a process for initiating purchase transactions using a token-based system, in accordance with various embodiments.

Referring now to FIG. 2 and FIG. 3, the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIG. 2 and FIG. 3, but also to the various system components as described above with reference to FIG. 1. FIG. 2 is flow chart illustrating a process for completing transactions in a token-based system, in accordance with various embodiments. The following description also refers to various system 100 components as shown in FIG. 1.

CAS 135 receives an authorization request for an item (step 205) by way of a payment network 130. In various embodiments, the authorization request includes a payment account first identifier, wherein the payment account first identifier was submitted to the merchant system via a token. CAS 135 constructs a query (step 210) having a search condition, wherein the search condition includes the payment account first identifier. Those of ordinary skill in the art will appreciate that a query may further include any number of additional search conditions in order to narrow a search. The query is invoked (step 215) by CAS 135 against one or more databases. CAS 135 retrieves payment account information (step 220) from the database in response to the payment account information including the search condition. In response to payment account information being returned based on the query, a payment account identifier is compared (step 225) to the payment account first identifier.

In response to the payment account identifier matching the payment account first identifier, it may be assumed that a payment account first identifier that was provided to the merchant 115 by the account holder 105 is the primary account identifier, as opposed to an account token. Because the system 100 functions to protect a primary account number, in response to one or more account tokens being defined, CAS 135 prevents the primary account identifier from being used to authorize a transaction against the corresponding account. Accordingly, CAS 135 sends a decline response (step 230) in response to the payment account first identifier and a primary account identifier from the payment account information being the same.

In various embodiments, in response to a comparison showing that the payment account identifier does not match the payment account first identifier, then it may be assumed that a payment account first identifier that was provided to the merchant 115 by the account holder 105 is an account token and not the primary account identifier. As such, CAS 135 may not send a decline response based on the provided payment account identifier. However, CAS 135 may not automatically send an authorization message based on this determination alone, as the authorization request may still result in a decline message based on other factors that are typically used to authorize a transaction.

In various embodiments, the authorization request may correspond to an authorization request or a settlement request. While backend operations vary between these transactions, the up-front authorization process may remain consistent. Therefore, a settlement request that originates from the merchant 115 may follow the same path as the preceding authorization request. This provides further protection against unauthorized or fraudulent use of a primary account identifier to obtain settlement for a false transaction.

FIG. 3 illustrates an exemplary flow chart 300 for completing settlement transactions using system 100, which is token-based. In response to an account holder 105 agreeing to enter into a financial transaction with a merchant 115, the account holder 105 may provide the merchant 115 or POS 120 an account identifier. In various embodiments, the account identifier is associated with a primary transaction account. In response to a merchant 115 receiving an account identifier from an account holder 105 (step 305), a merchant computer 125 formats the account identifier along with transaction details to construct a authorization request (step 310), where the authorization request in this context is for requesting authorization of a settlement transaction.

The merchant computer 125 transmits the authorization request (step 315) to a CAS 135. The CAS 135 constructs and runs a query (step 320) having a search condition comprising the payment account first identifier. The CAS 135 retrieves payment account information (step 325) from a database 140 in response to the payment account information including the search condition. The payment account first identifier and a primary account identifier from the payment account information are compared (step 330) by the CAS 135 to determine whether they match. If the payment account first identifier and a primary account identifier are the same (step 335), then the merchant computer 125 receives a decline response (step 340). If the payment account first identifier and a primary account identifier are not the same (step 335), then the merchant computer 125 receives an authorization response (step 345).

In various embodiments, the system and method may include alerting a subscriber when their computer is offline. The system may include generating customized information (e.g., about the token, authorization and/or settlement) and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user (e.g., the list of tokens). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are described relative to corresponding figures. In the detailed description herein, references to "various embodiments", "various embodiments", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Those of ordinary skill in the art will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

As used herein, a "user" may include any person or device that is configured to interact with any of the various systems and/or engage in the various processes that are described herein. A user, for example, may be an owner, manager, and/or user of a primary account identifier and/or account. The user may be a member applicant whose identity is the subject of a decision leading to issuance of an account in the name of the member and for the benefit of that member. In another context, the user might include an associate account holder who has been granted authority to execute transactions based on the account.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Terms and phrases similar to "associate", "associated", and/or "associating" may include tagging, flagging, correlating, using a look-up table or any other method or system for indicating or creating a relationship between elements, such as, for example, an account token and a primary transaction account. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

As used herein, the term "account holder", "primary account holder", "associate account holder", "business" or "merchant" may be used interchangeably with each other, and each shall mean any person, entity, government organization, business, machine, hardware, and/or software. A bank may be part of the system 100, but the bank may represent other types of account issuing institutions, such as transaction account companies, account sponsoring companies, or third party issuers under contract with financial institutions. It is further noted that other participants may be involved in some phases of the transaction, such as an intermediary settlement institution, but these participants are not shown.

As used herein, "match", "same", or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

In various embodiments, an account identifier may identify a consumer. In addition, in various embodiments, a consumer may be identified by a variety of identifiers, including, for example, an email address, a telephone number, a cookie id, a radio frequency identifier (RFID), a biometric, and the like.

A transaction instrument such as a charge card, payment card, debit card, awards card, prepaid card, telephone card, smart card, magnetic stripe card, bar code card, transponder, radio frequency card and/or the like having an account identifier, which cardholders typically present to merchant identifier, as part of a transaction, such as a purchase. An "account identifier", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account identifier may be distributed and stored in any form of plastic, electronic, magnetic, radio frequency, wireless, audio and/or optical device capable of transmitting or downloading data from itself to a second device. A customer account identifier may be, for example, a sixteen-digit payment card number, although each credit provider has its own numbering system, such as the fifteen-digit numbering system used by American Express. Each company's payment account numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a HADOOP® distributed file system (HDFS) as specified by the Apache Software Foundation at www.hadoop.apache.org/docs. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the account or external to but affiliated with account. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the account, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or account. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in various embodiments, the header or trailer is not stored on the transaction device along with the associated issuer-owned data but instead the appropriate action may be taken by providing to the transaction instrument user at the standalone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In various embodiments, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, INFORMIX® MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia COLD FUSION®, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the system may incorporate a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account identifier", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account identifier may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at www.emvco.com.

In various embodiments, account identifiers and/or account tokens as disclosed herein may be distributed and stored in any form of plastic, electronic, magnetic, radio frequency, wireless, audio and/or optical device capable of transmitting or downloading data from itself to a second device. A consumer account identifier may be, for example, a sixteen-digit account identifier, although each credit provider has its own numbering system, such as the fifteen-digit numbering system used by American Express. Each company's account identifiers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen-digit number. The intermediary eight-to-eleven digits are used to uniquely identify the consumer. A merchant account identifier may be, for example, any number or alpha-numeric characters that identify a particular merchant for purposes of account acceptance, account reconciliation, reporting, or the like.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method comprising:
   creating, by an authorization system, a single-use account token for a valid primary account identifier;
   sending, by the authorization system, the single-use account token as an email attachment to an email address of an associate account holder, wherein a user device is configured to physically isolate the email attachment in a quarantine memory sector of the user device and to load the single-use account token from the email attachment into a wallet application of the user device;
   preventing the valid primary account identifier from being used by the authorization system to authorize a transaction in response to the single-use account token being created;
   receiving, by the authorization system and from a merchant system, an authorization request including a payment account first identifier;
   determining, by the authorization system, that the payment account first identifier is the valid primary account identifier and not the single-use account token;
   declining, by the authorization system, the authorization request in response to determining that the payment account first identifier is the valid primary account identifier and not the single-use account token; and
   sending, by the authorization system and to the merchant system, a decline response.

2. The method of claim 1, wherein the authorization request is a settlement request or a payment authorization request.

3. The method of claim 1, further comprising:
   constructing, by the authorization system, a query having a search condition, wherein the search condition is the payment account first identifier;
   running, by the authorization system, the query against a database, wherein the database comprises at least one of a relational database management system or a data file; and
   retrieving, by the authorization system, payment account information including the valid primary account identifier from the database in response to the payment account information including the search condition.

4. The method of claim 1, further comprising parsing, by the authorization system, the authorization request to identify the payment account first identifier.

5. The method of claim 1, further comprising associating, by the authorization system, a transaction block indicator with the valid primary account identifier.

6. The method of claim 1, further comprising basing, by the authorization system, the decline response on additional factors.

7. The method of claim 1, wherein the decline response is not sent in response to the valid primary account identifier lacking a transaction block indicator.

8. A system comprising:
   a processor; and
   a tangible, non-transitory memory configured to communicate with the processor, the tangible, non-transitory memory having instructions stored thereon that, in response to execution by the processor, cause the processor to perform operations comprising:
      creating, by the processor, a single-use account token for a valid primary account identifier;
      sending, by the processor, the single-use account token as an email attachment to an email address of an associate account holder, wherein a user device is configured to physically isolate the email attachment in a quarantine memory sector of the user device and to load the single-use account token from the email attachment into a wallet application of the user device;
      preventing, by the processor, the valid primary account identifier from being used to authorize a transaction in response to the single-use account token being created;
      receiving, by the processor and from a merchant system, an authorization request including a payment account first identifier;
      determining, by the processor, that the payment account first identifier is the valid primary account identifier and not the single-use account token;
      declining, by the processor, the authorization request in response to determining that the payment account first identifier is the valid primary account identifier and not the single-use account token; and
      sending, by the processor and to the merchant system, a decline response.

9. The method of claim 1, further comprising determining, by the authorization system, that transaction information associated with the authorization request satisfies use parameters.

10. The method of claim 1, wherein the payment account first identifier is associated with an associate account holder.

11. The system of claim 8, further comprising:
constructing, by the processor, a query having a search condition, wherein the search condition is the payment account first identifier;
running, by the processor, the query against a database, wherein the database comprises at least one of a relational database management system or a data file; and
retrieving, by the processor, payment account information including the valid primary account identifier from the database in response to the payment account information including the search condition.

12. The system of claim 8, further comprising parsing, by the processor, the authorization request to identify the payment account first identifier.

13. The system of claim 8, further comprising associating, by the processor, a transaction block indicator with the valid primary account identifier.

14. The system of claim 8, further comprising basing, by the processor, the decline response on additional factors.

15. The system of claim 8, wherein the decline response is not sent in response to the valid primary account identifier lacking a transaction block indicator.

16. A computer-implemented method comprising:
receiving, by a merchant system, a payment account first identifier,
wherein an authorization system is configured, in response to a single-use account token being created for a valid primary account identifier, to send the single-use account token as an email attachment to an email address of an associate account holder and to prevent the valid primary account identifier from being authorized in an authorization request from the merchant system,
wherein a user device is configured to physically isolate the email attachment in a quarantine memory sector of the user device and to load the single-use account token from the email attachment into a wallet application of the user device;
transmitting, by the merchant system and to the authorization system, the authorization request including the payment account first identifier; and
receiving, at the merchant system, a decline response in response to the authorization system determining that the authorization request is declined because the payment account first identifier is the valid primary account identifier and not the single-use account token.

17. The method of claim 16, wherein the authorization system constructs and runs a query having a search condition comprising the payment account first identifier, and wherein payment account information including the valid primary account identifier is retrieved from a database in response to the payment account information including the search condition.

18. The system of claim 8, wherein the user device is further configured to at least:
transfer the email attachment to the quarantine a first memory sector of the user device;
perform an analysis on the email attachment; and
transfer the email attachment to a second memory sector of the user device based at least in part on the analysis.

19. The system of claim 18, wherein the analysis comprises comparing the email attachment to one or more malicious code-indicative patterns stored within a signature database.

20. The method of claim 1, wherein the user device is further configured to at least:
transfer the email attachment to the quarantine memory sector of the user device;
perform an analysis on the email attachment; and
transfer the email attachment to a second memory sector of the user device based at least in part on the analysis.

\* \* \* \* \*